(12) United States Patent
Langley

(10) Patent No.: US 8,989,520 B2
(45) Date of Patent: **\*Mar. 24, 2015**

(54) METHOD AND SYSTEM FOR CONDUCTING IDENTIFICATION MATCHING

(75) Inventor: Richard Jay Langley, Vienna, VA (US)

(73) Assignee: Daon Holdings Limited, George Town (KY)

(\*) Notice: Subject to any disclaimer, the term of this patent is extended or adjusted under 35 U.S.C. 154(b) by 644 days.

This patent is subject to a terminal disclaimer.

(21) Appl. No.: 12/953,527

(22) Filed: Nov. 24, 2010

(65) Prior Publication Data

US 2011/0211735 A1    Sep. 1, 2011

Related U.S. Application Data

(63) Continuation-in-part of application No. 12/714,568, filed on Mar. 1, 2010.

(51) Int. Cl.
| | |
|---|---|
| *G06K 9/60* | (2006.01) |
| *G06K 9/54* | (2006.01) |
| *G06K 9/68* | (2006.01) |
| *G06F 21/32* | (2013.01) |
| *G06K 9/00* | (2006.01) |

(52) U.S. Cl.
CPC .............. *G06K 9/6807* (2013.01); *G06F 21/32* (2013.01); *G06K 9/00892* (2013.01); *G06K 9/6857* (2013.01)
USPC .......................................... 382/305; 382/306

(58) Field of Classification Search
CPC .... G06F 21/32; G06K 9/6857; G06K 9/6807; G06K 9/00892
USPC ................. 382/115–125, 128–134, 159, 209, 382/217–222, 224–228, 305–306; 707/661–673, 736–750, 763, 765, 707/828–830
See application file for complete search history.

(56) References Cited

U.S. PATENT DOCUMENTS

| | | |
|---|---|---|
| 5,229,764 A | 7/1993 | Matchett et al. |
| 6,757,408 B2 | 6/2004 | Houvener |

(Continued)

OTHER PUBLICATIONS

Benchmarking Quality-Dependent and Cost-Sensitive Score-Level Multimodal Biometric Fusion Algorithms,Poh et al.,Info. Forensics and Security,Dec. 29,vol. 4,Issue 5, pp. 849-866.

(Continued)

*Primary Examiner* — Brian Le
(74) *Attorney, Agent, or Firm* — Kevin McDermott, Esq.

(57) ABSTRACT

A method of conducting pattern matching is provided that includes establishing probe categories. Each probe category corresponds to pattern characteristics of one of a plurality of subpopulations. Moreover, the method includes coordinating combinations of the subpopulations and probe categories with pattern matching systems such that each combination corresponds to at least one of a plurality of the pattern matching systems, obtaining pattern data for an object, configuring the obtained object pattern data as a probe, and determining the probe category of the probe. Furthermore, the method includes conducting a matching transaction between the probe and each of the subpopulations using the at least one matching system corresponding to each combination of subpopulation and the determined probe category, and determining at least one candidate match when the probe matches at least one enrollment data record in the at least one matching system of any of the subpopulations.

21 Claims, 6 Drawing Sheets

| 48 / 50 | 52 | 54 | 56 |
|---|---|---|---|
| Primary Biometric Modality Subpopulations | Secondary Biometric Modality Subpopulations | Tertiary Biometric Modality Subpopulations | Subpopulation Designation |
| Finger – High Quality Data 50-1 | Iris – High Quality Data 52-1 | Face – High Qual. Data 54-1 | A |
| | | Face – Low Qual. Data 54-2 | B |
| | Iris – Low Quality Data 52-2 | Face – High Qual. Data 54-3 | C |
| | | Face – Low Qual. Data 54-4 | D |
| | Iris – Unavailable 52-3 | Face – High Qual. Data 54-5 | E |
| | | Face – Low Qual. Data 54-6 | F |
| Finger – Low Quality Data 50-2 | Iris – High Quality Data 52-4 | Face – High Qual. Data 54-7 | G |
| | | Face – Low Qual. Data 54-8 | H |
| | Iris – Low Quality Data 52-5 | Face – High Qual. Data 54-9 | I |
| | | Face – Low Qual. Data 54-10 | J |
| | Iris – Unavailable 52-6 | Face – High Qual. Data 54-11 | K |
| | | Face – Low Qual. Data 54-12 | L |
| Finger – Unavailable 50-3 | Iris – High Quality Data 52-7 | Face – High Qual. Data 54-13 | M |
| | | Face – Low Qual. Data 54-14 | N |
| | Iris – Low Quality Data 52-8 | Face – High Qual. Data 54-15 | O |
| | | Face – Low Qual. Data 54-16 | P |
| | Iris – Unavailable 52-9 | Face – High Qual. Data 54-17 | Q |
| | | Face – Low Qual. Data 54-18 | R |

(56) References Cited

U.S. PATENT DOCUMENTS

| | | |
|---|---|---|
| 6,950,536 B2 | 9/2005 | Houvener |
| 7,242,810 B2 | 7/2007 | Chang |
| 7,287,013 B2 | 10/2007 | Schneider et al. |
| 7,492,943 B2 | 2/2009 | Li et al. |
| 7,558,407 B2 | 7/2009 | Hoffman et al. |
| 7,558,765 B2 | 7/2009 | Kiefer |
| 7,616,788 B2 | 11/2009 | Hsieh et al. |
| 7,835,548 B1 | 11/2010 | Langley |
| 8,031,981 B2 * | 10/2011 | Peirce ............................ 382/305 |
| 2006/0021003 A1 | 1/2006 | Fisher et al. |
| 2006/0171571 A1 | 8/2006 | Chan et al. |
| 2006/0222211 A1 | 10/2006 | Olivo, Jr. et al. |
| 2007/0036400 A1 | 2/2007 | Watanabe et al. |
| 2007/0050636 A1 | 3/2007 | Menczel et al. |
| 2007/0071286 A1 | 3/2007 | Lee et al. |
| 2007/0172114 A1 | 7/2007 | Baker et al. |
| 2007/0183625 A1 | 8/2007 | Dussich et al. |
| 2007/0189585 A1 | 8/2007 | Sukegawa et al. |
| 2007/0239991 A1 | 10/2007 | Cheng |
| 2007/0288452 A1 | 12/2007 | Podilchuk |
| 2008/0052527 A1 | 2/2008 | Siedlarz |
| 2008/0059807 A1 | 3/2008 | Miller, Jr. et al. |
| 2008/0065900 A1 | 3/2008 | Lee et al. |
| 2008/0101658 A1 | 5/2008 | Ahern et al. |
| 2008/0192988 A1 | 8/2008 | Uludag et al. |
| 2009/0037978 A1 | 2/2009 | Luque et al. |
| 2009/0080778 A1 | 3/2009 | Lee et al. |
| 2009/0113209 A1 | 4/2009 | Lee et al. |
| 2009/0232361 A1 | 9/2009 | Miller |
| 2009/0271634 A1 | 10/2009 | Boult et al. |
| 2009/0289760 A1 | 11/2009 | Murakami et al. |
| 2010/0030695 A1 | 2/2010 | Chen et al. |
| 2010/0039223 A1 | 2/2010 | Siedlarz |
| 2010/0045787 A1 | 2/2010 | Uno |
| 2010/0088233 A1 | 4/2010 | Tattan et al. |
| 2011/0211734 A1 * | 9/2011 | Langley ........................ 382/115 |

OTHER PUBLICATIONS

An adaptive multi-biometric incremental fusion strategy in the context of BMEC 2007, Alano et al., Control, Automation, Robotics and Vision, Dec. 2008, pp. 1144-1149.

"Adaptive feature set updating algorithm for multimodal biometrics", Kekre et al., ACM Special Interest Group on Artificial Intelligence, 2009, pp. 277-282.

"Two-stage fingerprint classification system", Cappelli et al., Proceedings of the 2003 ACM SIGMM workshop on Biometrics methods and applications, Nov. 2003, pp. 95-99.

Vatsa et al., Integrating Image Quality in 2v-SVM Biometric Match Score Fusion, Int'l Journal of Neural Systems, vol. 17, No. 5, Oct. 26, 2007, pp. 343-351.

Kittler et al., Quality Dependent Fusion of Intramodal and Multimodal Biometric Experts. Biom. Tech. for Human Ident. IV. Proc. of SPIE vol. 6539, 653903 (2006), pp. 1-14.

International Search Report and Written Opinion for foreign application No. PCT/US11/26009, dated May 9, 2011, pp. 1-9.

* cited by examiner

METHOD AND SYSTEM FOR CONDUCTING IDENTIFICATION MATCHING

CROSS-REFERENCE TO RELATED APPLICATIONS

This is a continuation-in-part application of U.S. patent application Ser. No. 12/714,568, filed Mar. 1, 2010.

BACKGROUND OF THE INVENTION

This invention relates generally to methods and systems for conducting identification matching, and more particularly, to methods and systems for conducting biometric 1:N identification matching.

Biometric fusion combines a plurality of biometric samples, of the same or different biometric modality, to yield higher accuracy and lower false accept rates during matching in 1:N biometric matching systems. Known biometric fusion techniques include parallel fusion and cascade fusion. Parallel fusion techniques generally involve score-level fusion of individual biometric scores into a single composite score. However, known parallel fusion techniques always require biometric data for each modality to be matched.

Cascade fusion techniques generally execute a series of algorithms such that a subsequent algorithm is executed against candidate matches determined by a previous algorithm. However, cascade fusion assumes that every candidate always includes all the biometric modalities. However, it is rare for all members of a given population to be able to provide all biometric modalities required by either parallel or cascade fusion techniques. For example, amputees may not be able to provide finger biometric data samples. Furthermore, when using data from legacy systems to conduct 1:N identity matching, the legacy data may not include all the biometric data required by parallel and cascade fusion systems.

Known biometric matching systems fail to separate a matching coordinator system for an overall population from the provisioning of the matching systems. Thus, using known biometric matching systems, it is difficult, time consuming and expensive to apply certain matching algorithms to data from specific groups of individuals within the overall population. Consequently, it appears that separating the matching coordinator system operations from the matching systems may facilitate easier application of certain matching algorithms against data from specific groups of individuals, and may thereby reduce associated time and costs.

BRIEF DESCRIPTION OF THE INVENTION

In one aspect, a method of conducting pattern matching is provided that includes establishing probe categories. Each probe category corresponds to pattern characteristics of one of a plurality of subpopulations. Moreover, the method includes coordinating combinations of the subpopulations and probe categories with pattern matching systems such that each combination corresponds to at least one of a plurality of the pattern matching systems, obtaining pattern data for an object, configuring the obtained object pattern data as a probe, and determining the probe category of the probe. Furthermore, the method includes conducting a matching transaction between the probe and each of the subpopulations using the at least one matching system corresponding to each combination of subpopulation and the determined probe category, and determining at least one candidate match when the probe matches at least one enrollment data record in the at least one matching system of any of the subpopulations.

In another aspect, a system for conducting pattern matching is provided. The system includes at least one pattern matching system operable to store enrollment data records of a subpopulation assigned thereto, at least one client system operable to at least obtain object pattern data, and a computer configured as a server. The server includes at least a database and is operable to communicate with the at least one matching system and the at least one client system. Moreover, the server is operable to store within the database at least enrollment data records of a plurality of subpopulations, establish probe categories that each correspond to pattern characteristics of one of the subpopulations, and convert obtained object pattern data into a probe and determine the probe category of the probe. The at least one pattern matching system is further operable to conduct a matching transaction between the probe and each of the subpopulations, and determine at least one candidate match when the probe matches at least one enrollment data record from any of the subpopulations.

In yet another aspect, another method of conducting object pattern matching is provided. The method includes coordinating a plurality of subpopulations with matching systems such that each subpopulation corresponds to at least one of the matching systems. The coordinating operation is based on at least one pattern associated with each subpopulation. The method also includes obtaining object pattern data and configuring the obtained object pattern data as a probe, conducting a matching transaction between the probe and each subpopulation using the at least one matching system corresponding to each subpopulation, and determining at least one candidate match when the probe matches at least one enrollment data record in the at least one corresponding matching system.

DETAILED DESCRIPTION OF THE INVENTION

Figure 1:
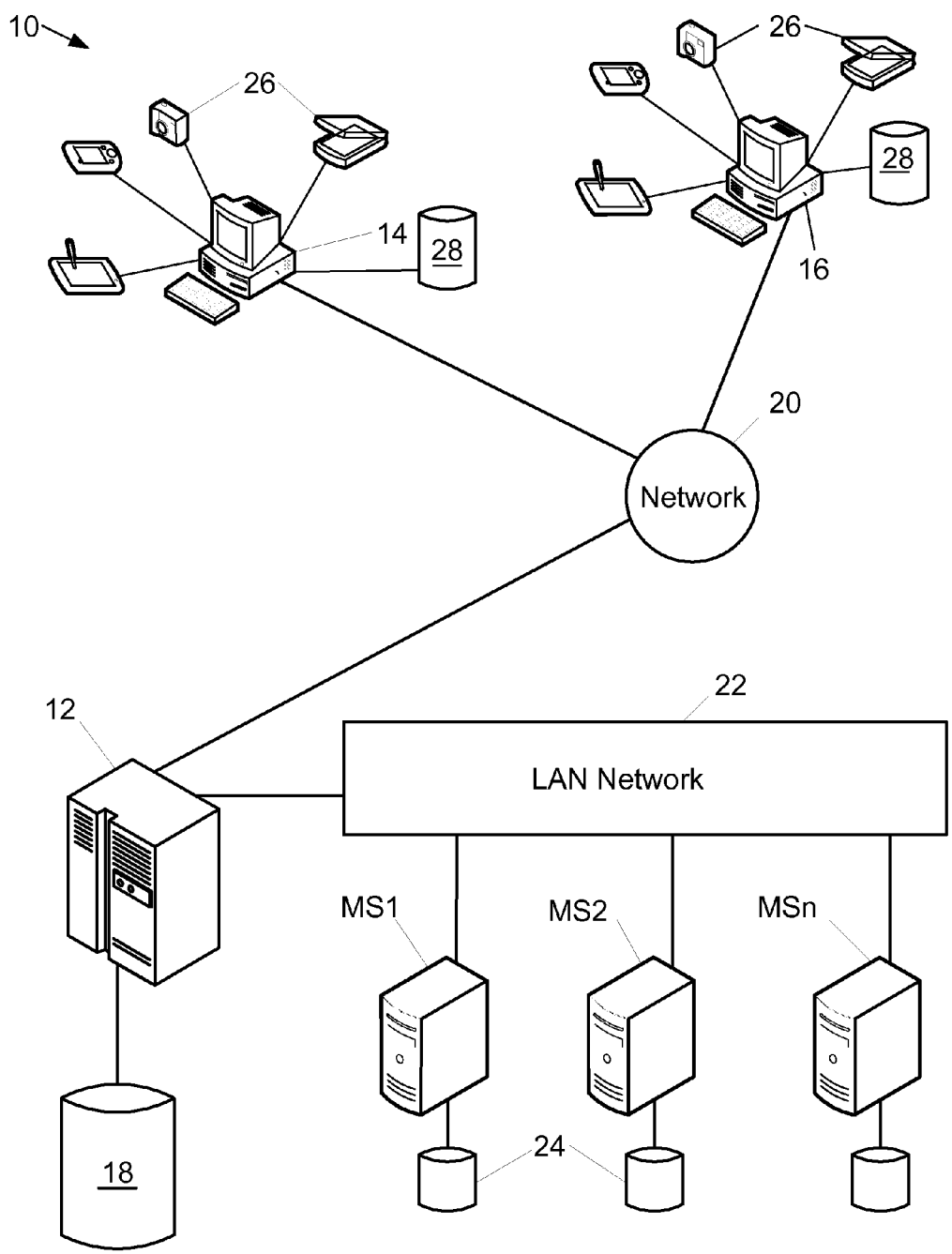
FIG. 1 is an expanded block diagram of an exemplary embodiment of a system architecture of a Sequential Fusion Computer (SFC) System.

FIG. 1 is an expanded block diagram of an exemplary embodiment of a system architecture of a Sequential Fusion Computer (SFC) System 10 for implementing 1:N identity matching that accounts for individuals who are not associated with all the modalities of biometric data used by the SFC system 10. More specifically, the SFC system 10 includes a Global Population Manager and Match Coordinator (GPMMC) System 12, a plurality of biometric matching systems MSn, at least one front end enrollment client system 14, and one back end client system 16. It should be understood that as described herein a 1:N identity match refers to identification of an individual by comparing the identifying information of the individual against identifying information of a plurality of other individuals. In the exemplary embodiment, biometric data is the identifying information.

In the exemplary embodiment, the GPMMC system 12 includes components such as, but not limited to, a web server, a database server, an application server, a match coordination server, a directory server and a disk storage unit 18. The disk storage unit 18 may be used to store any kind of data. The match coordination server is configured to manage matching of any biometric modality or information associated with individuals enrolled in the GPMMC system 12 such that 1:N identity matching may be conducted as described herein. Although these components are combined to form a single structure in the form of the GPMMC system 12 in the exemplary embodiment, it should be appreciated that in other embodiments these components may be separately positioned at different locations and operatively coupled together in a network such as, but not limited to, a local area network (LAN), a wide area network (WAN), or the Internet. The GPMMC system 12 is typically configured to be communicatively coupled to end users at the client systems 14, 16 using a communications network 20 such as, but not limited to, a LAN, a WAN, or the Internet. Moreover, the network 20 may include any combination of a LAN, a WAN and the Internet. The GPMMC system 12 is also configured to be communicatively coupled to the biometric matching systems MSn over a LAN 22. It should be understood that any authorized end user at the client systems 14, 16 may access the GPMMC system 12.

In the exemplary embodiment, the GPMMC system 12 is a computer system that conducts the overall process of 1:N identity matching. The client systems 14, 16, the GPMMC system 12, and the matching systems MSn may be associated with any entity involved with conducting identity matching including, but not limited to, motor vehicle administrations, national identity registrars, pension system administration agencies, welfare system administration agencies, financial institutions and medical service providers. Thus, it should be appreciated that the GPMMC system 12 may be any computer system associated with any entity that conducts 1:N matching.

It should be understood that the GPMMC system 12 is configured to store therein biometric data of a population to be processed. That is, the GPMMC system 12 is configured to store and manage biometric data of the entire population such that each individual in the entire population may be processed in a 1:N identity matching operation conducted for the entire population. The GPMMC system 12 is configured to at least determine at least one of the matching systems MSn that is to be used for conducting 1:N identity matching and 1:1 identity verification, determine data quality categories, define subpopulations within a population, generate a matrix, and determine a plurality of biometric modalities. Using biometrics as the basis for identification facilitates enhancing trust in the 1:N identity matching. In order to facilitate properly conducting 1:N identity matching, the GPMMC system 12 stores raw biometric data in the form of GPMMC enrollment data records. It should be understood that raw biometric data includes an image corresponding to a captured biometric modality such as, but not limited to, fingerprints and face. The raw data for each individual is processed to generate at least one matching template for each respective individual which is stored and used by the matching systems MSn. In the exemplary embodiment, each GPMMC enrollment data record includes at least raw biometric data obtained from the respective individual enrolled therein. It should be appreciated that in other embodiments each GPMMC enrollment data record may also include the matching template for the respective individual. Moreover, in other embodiments the GPMMC system 12 is not required to store the raw biometric data permanently. In such other embodiments the raw biometric data may be stored in another computer system, or discarded after matching templates are generated.

In the exemplary embodiment, each of the matching systems MSn includes components such as, but not limited to, a web server, a disk storage device 24, a database management server, an application server, and a matching server. Although these components are combined into a single structure in the exemplary embodiment, it should be appreciated that in other embodiments these components may be separately positioned at different locations and operatively coupled together in a network such as, but not limited to, a LAN, a WAN, or the Internet. The disk storage device 24 may be used for storing at least matching templates, and the database management system may be used to facilitate transferring data to and from the disk storage device 24. Each matching server is configured to conduct a 1:N identity match of enrollees with a specific biometric modality or with any combination of multiple biometric modalities. However, it should be appreciated that in other embodiments each matching server may also be configured to conduct identity matching with any information associated with an enrollee such as, but not limited to, biographic data, and to verify the claimed identity of an individual by performing a 1:1 search. It should be appreciated that the designation "n" as used in conjunction with the matching systems MSn, is intended to indicate that any number "n" of matching systems may be used that facilitates conducting 1:N identity matching of enrollees as described herein.

In the exemplary embodiment, in contrast to the GPMMC system 12, each of the matching systems MSn is configured to store therein biometric data of a portion of an entire population. That is, each matching system MSn is configured to store and manage a portion of the entire population enrolled in the GPMMC system 12, and to conduct 1:N identity matching for only that portion of the entire population stored therein. Similar to the GPMMC system 12, each of the matching systems MSn is configured to store biometric data in the form of matching system enrollment data records. A matching system enrollment data record for each individual enrolled in the GPMMC system 12 is stored therein and includes at least a matching template for the individual. In other embodiments each matching system enrollment data record may also include the raw biometric data of the respective individual. It should be appreciated that, in general, each matching system MSn stores biometric data for different enrollees. However, due to practical design considerations such as, but not limited to, total numbers of matching systems MSn and various ways individuals may attempt to circumvent duplicate detection, different matching systems MSn may also store biometric data for a number of the same enrollees.

It should be understood that each of the matching systems MSn is configured to store therein a respective matching application that causes the respective matching system MSn to execute a matching algorithm selected based on the subpopulation stored therein. In the exemplary embodiment each subpopulation is defined primarily based on characteristics of the subpopulation's biometric data. The matching algorithm executed by each matching system MSn corresponds to the biometric data characteristics of a respective subpopulation. Thus, in the exemplary embodiment, each subpopulation is associated with at least one corresponding matching system MSn. Each of the matching systems MSn is configured to be communicatively coupled to the GPMMC system 12 over the LAN 22. It should be appreciated that the matching systems MSn are not configured to be communicatively coupled to the clients systems 14, 16. Likewise, the client systems 14, 16 are not configured to be communicatively coupled to the matching systems MSn.

In the exemplary embodiment, raw biometric data corresponding to any biometric modality may be collected and stored as GPMMC enrollment data records in the GPMMC system 12, and matching templates derived from the collected raw biometric data are stored in the matching systems MSn. Such biometric modalities include, but are not limited to, finger, iris, face and voice. Moreover, the raw biometric data may take any form such as, but not limited to, images, photographs, and electronic data representations.

In order to conduct 1:N identity matching of individuals with the GPMMC system 12 and the matching systems MSn, the raw biometric data of a plurality of individuals should be obtained and stored in the GPMMC system 12, and corresponding matching templates derived and stored in the matching systems MSn, prior to conducing 1:N identity matches. Obtaining and storing such data prior to conducting identity matching operations is generally known as enrolling an individual. It should be appreciated that the GPMMC enrollment data records and the matching system enrollment data records, together constitute a gallery of enrollment data records.

In the exemplary embodiment the client systems 14 are configured to include enrollment screens appropriate for obtaining finger, face, and iris raw biometric data during enrollment, and are configured to include biometric capture devices 26 for capturing finger, face, and iris biometric data submitted by individuals. Although desired biometric data is captured from individuals during enrollment, it should be appreciated that in other embodiments the raw biometric data may be obtained by any method and entered into the GPMMC system 12. Moreover, matching templates corresponding to the raw biometric data may be obtained and entered into the matching systems MSn using any method that facilitates 1:N identity matching as described herein. Such methods include, but are not limited to, automatically reading or extracting the desired raw biometric data or matching template from identity documents, and extracting the desired raw biometric data or desired matching template from legacy databases included in other client systems 16. Such other client systems 16 include, but are not limited to, client systems 16 associated with motor vehicle administrations, social security administrations, welfare system administrations, financial institutions and health care providers. Such identity documents include, but are not limited to, passports and driver's licenses. It should be appreciated that by extracting desired raw biometric data or matching templates from at least one legacy database and storing the extracted raw biometric data or extracted matching templates in the GPMMC system 12 or in at least a respective one of the matching systems MSn, respectively, individuals may be enrolled without having to provide raw biometric data at the time of enrollment into the GPMMC system 12.

In other embodiments biographic data may also be obtained from individuals and stored in the GPMMC system 12, and in the matching systems MSn. In such other embodiments, the biographic data is included in the GPMMC enrollment data records such that the biographic data is associated with the raw biometric data of the corresponding enrollee in the GPMMC system 12. Moreover, in such other embodiments, the biographic data is included in the matching system enrollment data records such that the biographic data is associated with the matching template of the respective enrollees in the matching systems MSn.

The term "biographic data" as used herein includes any demographic information regarding an individual as well as contact information pertinent to the individual. Such demographic information includes, but is not limited to, an individual's name, age, date of birth, address, citizenship and marital status. Moreover, biographic data may include contact information such as, but not limited to, telephone numbers and e-mail addresses. However, it should be appreciated that in other embodiments any desired data associated with the individual may be enrolled.

The front end enrollment client systems 14 and the back end client systems 16 each may include devices, such as, but not limited to, a CD-ROM drive for reading data from computer-readable recording mediums, such as a compact disc-read only memory (CD-ROM), a magneto-optical disc (MOD) and a digital versatile disc (DVD). Additionally, the computers included in each of the client systems 14, 16 may include a memory (not shown). Moreover, each of the client systems 14, 16 may include display devices, such as, but not limited to, liquid crystal displays (LCD), cathode ray tubes (CRT) and color monitors. Furthermore, each of the client systems 14, 16 may include printers and input devices such as, but not limited to, a mouse (not shown), keypad (not shown), a keyboard, a microphone (not shown). Additionally, the enrollment client systems 14 may include components such as, but not limited to, a web server, a database server, an application server, a directory server and a disk storage unit 28, and biometric capture devices 26. The disk storage unit 28 may be used to store any kind of data.

Each of the biometric capture devices 26 includes hardware configured to capture a specific type of biometric sample. In the exemplary embodiment, each biometric capture device 26 may be any device that captures any kind of desired biometric data sample that facilitates conducting 1:N identity matching as described herein. Such devices include, but are not limited to, iris scanners, fingerprint scanners, vascular scanners, digital cameras, and microphones. It should be appreciated that although the exemplary embodiment includes one enrollment client system 14 and one back end client system 16, other embodiments may include any number of enrollment client systems 14 and any number of back end client systems 16. It should be understood that such other embodiments may not include the back end client system 16.

The GPMMC system 12, each of the matching systems MSn, and each of the client systems 14, 16 includes a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that the processor executes instructions, or computer programs, stored in the memory (not shown). The above examples are exemplary only, and are thus not intended to limit in any way the definition and/or meaning of the term "processor."

The memory (not shown) in the GPMMC system 12, in each of the matching systems MSn and in the client systems 14, 16, can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

It should be appreciated that the memory of GPMMC system 12, the memory of each of the matching systems MSn, and the memory included in the client systems 14, 16, is used to store executable instructions, also known as computer programs or applications, therein. The terms "computer program" and "application" are intended to encompass an executable program that exists permanently or temporarily on any computer-readable recordable medium that causes the computer or computer processor to execute the program.

Figure 2:
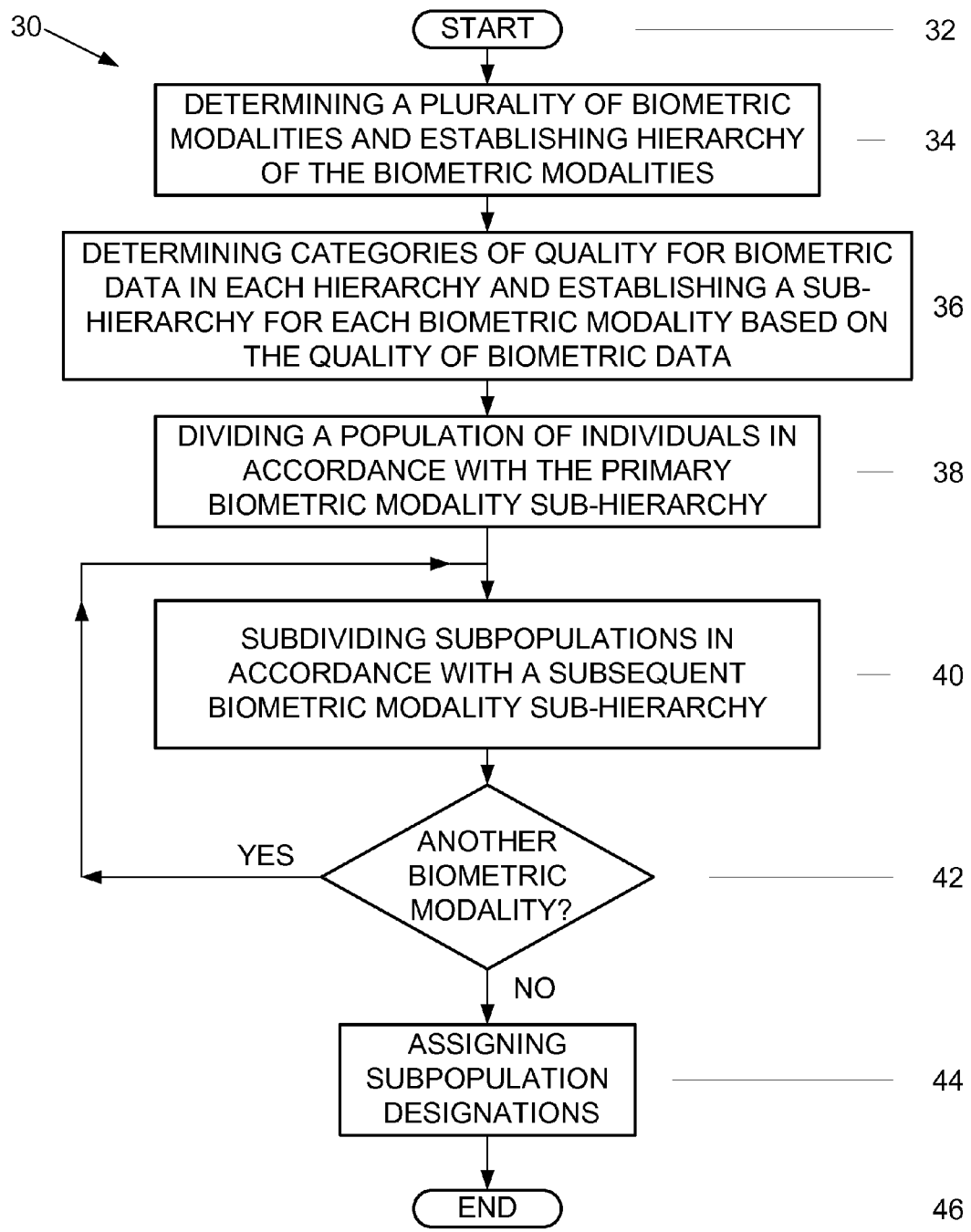
FIG. 2 is a flowchart illustrating an exemplary process for dividing a population of individuals into subpopulations.

FIG. 2 is a flowchart 30 illustrating an exemplary process for dividing a population of individuals into subpopulations. The process starts 32 by determining 34 a plurality of biometric modalities based on criteria such as, but not limited to, strong 1:N identity matching performance, low cost, reliability, and prevalence in legacy databases. Processing continues by establishing a hierarchy of the biometric modalities 34 by determining which of the biometric modalities best conforms to the criteria. In the exemplary embodiment, the plurality of biometric modalities includes iris, face and finger. Finger biometric data is judged to best conform to the criteria because finger biometric data is associated with reliable 1:N identity matching results, and is prevalent amongst many legacy databases. Note that reliable matching results as used herein means the most accurate matching results achievable relative to matching results generated using other available biometric modalities, and relative to the requirements of the matching application. Because finger biometric data best conforms to the criteria, finger biometric data is determined to be the primary biometric modality used for conducting 1:N identity matching in the exemplary embodiment. Because iris biometric data is also associated with very strong 1:N identity matching performance and favorable cost characteristics, iris biometric data is determined to be the secondary biometric modality in the exemplary embodiment. Face biometric data is currently associated with unacceptably poor 1:N identity matching performance and is currently associated with high false accept rates. Thus, it is determined that face biometric data poorly conform to the criteria. As a result, face biometric data is determined to be the tertiary biometric modality used for 1:N identity matching in the exemplary embodiment.

It should be understood that the primary biometric modality is the preferred biometric modality for conducting 1:N identity matches. When adequate primary biometric modality data is not available secondary biometric modality data is used, and when adequate secondary biometric modality data is not available tertiary biometric modality data is used to conduct 1:N identity matching in the exemplary embodiment. Consequently, in the exemplary embodiment a hierarchy of biometric modalities is established that includes a primary biometric modality, a secondary biometric modality, and a tertiary biometric modality. It should be understood that the use of a primary, secondary or tertiary biometric modality does not preclude using other additional biometric modalities to assist in refining the matches for each sub-population. Neither does it preclude the use of combinations of biometric modalities within subpopulations.

After establishing the hierarchy of biometric modalities 34, processing continues by determining categories of quality for biometric data 36. In the exemplary embodiment, biometric data is categorized as one of high quality data, low quality data and unavailable data. High quality data indicates that biometric data satisfies a required quality threshold, and low quality data indicates that biometric data has been obtained, but does not satisfy the required quality threshold. It should be appreciated that individuals associated with high quality data are considered to be fully enrolled with respect to the respective biometric modality, and that individuals associated with low quality biometric data are not successfully enrolled with respect to the respective biometric modality. Unavailable data indicates that particular biometric data for an individual simply was not successfully obtained from the individual during enrollment. The particular biometric data may not have been obtained because associated fingers were amputated, or the enrollment data records for an individual were obtained electronically from a different biometric legacy system and the particular biometric data was not included in the enrollment data record because the particular biometric was not obtained during enrollment in that biometric legacy system.

Next, processing continues by establishing a sub-hierarchy 36 for each biometric modality included in the hierarchy of biometric modalities. In the exemplary embodiment, each sub-hierarchy is determined based on the quality of biometric data to be included in the hierarchy. Thus, the primary biometric modality is subdivided into a category for individuals associated with high quality finger biometric data, a category for individuals associated with low quality finger biometric data, and a category for individuals from whom finger biometric data was unavailable and who thus are not associated with finger biometric data. Thus, the primary biometric modality sub-hierarchy includes high quality finger biometric data, low quality finger biometric data, and unavailable finger biometric data. Likewise, the secondary biometric modality is subdivided into a category for individuals associated with high quality iris biometric data, a category for individuals associated with low quality iris biometric data, and a category for individuals from whom iris biometric data was unavailable and who thus are not associated with iris biometric data. Thus, the secondary biometric modality sub-hierarchy includes high quality iris biometric data, low quality iris biometric data, and unavailable iris biometric data. The tertiary biometric modality is subdivided into categories for individuals associated with high and low quality face biometric data. The tertiary biometric modality is not subdivided into a category for unavailable face biometric data in the exemplary embodiment. Thus, the tertiary biometric modality sub-hierarchy includes high and low quality face biometric data. The sub-hierarchy 36 for each biometric modality may be established by dividing each of the biometric modalities into any number of categories. Moreover, as described herein, each of the biometric modalities may be divided into different numbers of categories. Furthermore, the category need not be based on the quality of the biometric data, and instead may be based on any criteria that facilitate subdividing populations as described herein.

High quality biometric data is used for conducting 1:N identity matching in the exemplary embodiment. However, when high quality biometric data is not available, low quality biometric data may be used, but may be processed differently than high quality data. Although the exemplary embodiment uses biometric modalities of finger, iris and face, it should be appreciated that in other embodiments any other biometric modality may be used that conforms to the criteria described herein. Such other biometric modalities include, but are not limited to, voice, vein, and hand geometry. Moreover, although three biometric modalities are described in the exemplary embodiment, it should be appreciated that in other embodiments any number of biometric modalities may be used that facilitates subdividing populations as described herein. Although the exemplary embodiment defines the primary, secondary and tertiary biometric modalities as finger, iris, and face, respectively, it should be appreciated that in other embodiments the primary, secondary and tertiary biometric modalities may be defined using any combination of biometric data. For example, in such other embodiments, the primary, secondary and tertiary biometric modalities may be defined as iris, face and voice, respectively.

Next, processing continues by dividing a population of individuals, enrolled in the GPMMC system 12, into a plurality of subpopulations in accordance with the primary biometric modality sub-hierarchy 38. Specifically, each individual enrolled in the GPMMC system 12 is associated with a respective one of the high quality finger biometric data category, the low quality finger biometric data category, and the unavailable finger biometric data category. By virtue of associating each of the individuals with a respective category, the entire population of individuals enrolled in the GPMMC system 12 is subdivided into three different subpopulations. A first subpopulation includes individuals associated with high quality finger biometric data, a second subpopulation includes individuals associated with low quality finger biometric data, and a third subpopulation includes individuals who are not associated with finger biometric data.

Processing continues by further subdividing each of the first, second and third subpopulations in accordance with a subsequent biometric modality sub-hierarchy 40. In the exemplary embodiment the subsequent biometric modality sub-hierarchy is the second biometric modality sub-hierarchy. Thus, each individual included in the first, second and third subpopulations is associated with a respective one of the high quality iris biometric data category, the low quality iris biometric data category, and the unavailable iris biometric data category. By virtue of associating each of the individuals with a respective category included in the secondary biometric modality sub-hierarchy, each of the first, second and third subpopulations is further divided into three different subpopulations such that the total population enrolled in the GPMMC system 12 is divided into nine different subpopulations.

After subdividing the first, second and third subpopulations 40, processing continues by determining whether another biometric modality is to be used for further subdividing the nine different subpopulations 42. When another biometric modality is not to be used for subdividing the nine different subpopulations 42, processing continues by assigning subpopulation designations to each of the nine different subpopulations 44. Otherwise, processing continues by further subdividing each of the nine different subpopulations in accordance with a different subsequent biometric modality sub-hierarchy 40. In the exemplary embodiment the nine different subpopulations are to be subdivided by a subsequent biometric modality sub-hierarchy 40 different than the primary and secondary biometric sub-hierarchies. The different subsequent biometric modality is the tertiary biometric modality. Thus, each individual included in the nine different subpopulations is associated with a respective one of the high quality face biometric data category and the low quality face biometric data category. By virtue of associating each of the individuals with a respective category included in the sub-hierarchy of the tertiary biometric modality, each of the nine different subpopulations is further divided into two different subpopulations such that the total populations enrolled in the GPMMC system 12 is divided into eighteen different subpopulations. Next, processing continues by determining that another biometric modality is not to be used for subdividing the eighteen subpopulations 42, and assigning subpopulation designations 44 to each of the eighteen subpopulations. In the exemplary embodiment, alphabetic characters are used to designate each subpopulation. However, in other embodiments any method for designating the subpopulations may be used including, but not limited to, designating the subpopulations with alphanumeric characters. Next, processing ends 46.

Figure 3:
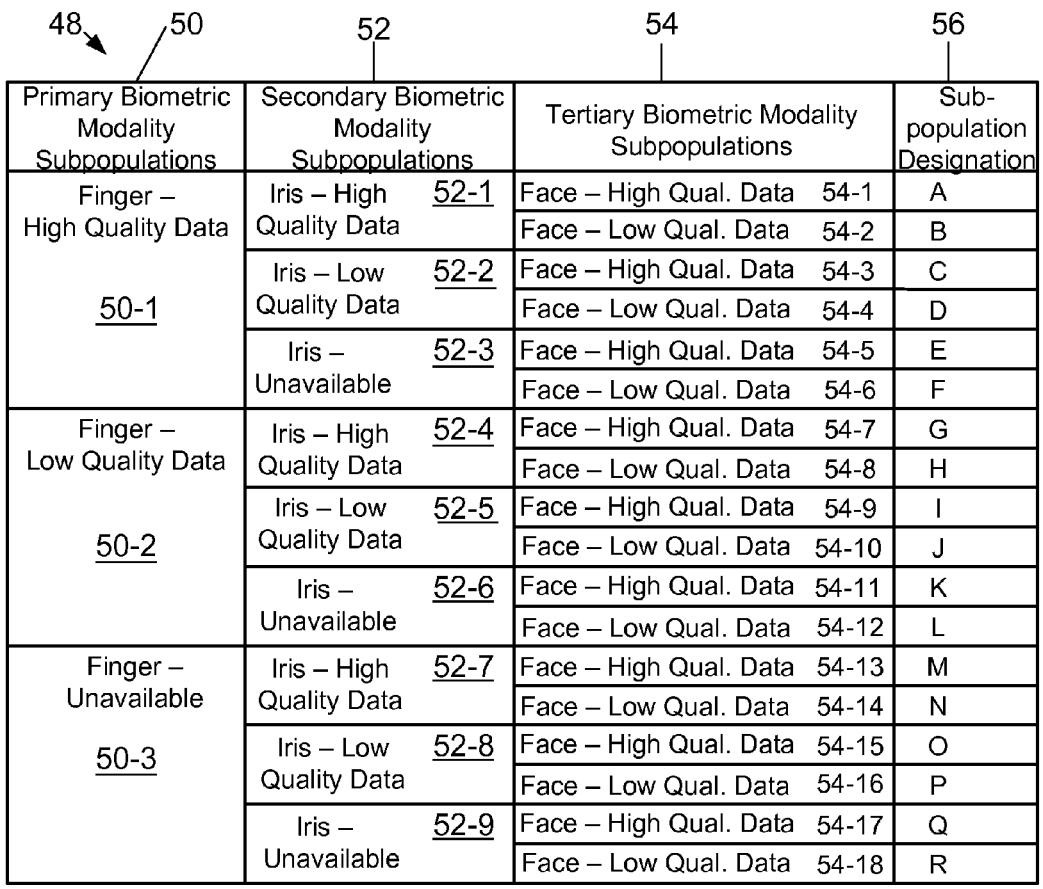
FIG. 3 is a diagram illustrating a graphical representation of the subpopulations determined in accordance with the flowchart illustrated in FIG. 2.

FIG. 3 is a diagram 48 illustrating a graphical representation of the subpopulations determined in accordance with the flowchart 30 described herein and as illustrated in FIG. 2. Specifically, the diagram 48 includes a column for each of the biometric modalities included in the hierarchy of biometric modalities. Thus, the diagram 48 includes a column for the primary biometric modality 50, a column for the secondary biometric modality 52, and a column for the tertiary biometric modality 54. The diagram 48 also includes a column for subpopulation designations 56. The first, second and third subpopulations are represented as high quality finger data 50-1, low quality finger data 50-2, and unavailable finger data 50-3, respectively. Moreover, the nine different subpopulations are represented as high quality iris data 52-1, 52-4, 52-7 low quality iris data 52-2, 52-5, 52-8, and unavailable iris data 52-3, 52-6, 52-9. It should be understood that each of the high quality iris data subpopulations 52-1, 52-4, 52-7 are different, each of the low quality iris data subpopulations 52-2, 52-5, 52-8 is different, and each of the unavailable iris data subpopulations 52-3, 52-6, 52-9 is different. Furthermore, the eighteen subpopulations are represented as high quality face data 54-1, 54-3, 54-5, 54-7, 54-9, 54-11, 54-13, 54-15, 54-17, and low quality face data 54-2, 54-4, 54-6, 54-8, 54-10, 54-12, 54-14, 54-16, 54-18. It should be understood that each of the high quality face data subpopulations 54-1 to 54-17 is different, and that each of the low quality face data subpopulations 54-2 to 54-18 is different. The subpopulation designation column 56 includes subpopulation designations A-R that each correspond to one of the face data subpopulations 54-1 to 54-18.

The high quality finger data subpopulation 50-1 is associated with the iris subpopulations 52-1, 52-2, 52-3; low quality finger data population 50-2 is associated with iris subpopulations 52-4, 52-5, 52-6; and, the unavailable finger data subpopulation 50-3 is associated with iris subpopulations 52-7, 52-8, 52-9. Moreover, the iris subpopulations 52-1 to 52-9 are associated with a corresponding different one of the high quality face subpopulations and a corresponding different one of the low quality face subpopulations.

It should be understood that the diagram 48 is also a graphical representation of the subdividing process described herein with regard to FIG. 2. For example, reading the diagram 48 from the primary biometric modality column 50 to the subpopulation designation column 56, individuals included in the subpopulation 50-1 may also be included in the high quality iris biometric data subpopulation 52-1. Moreover, individuals included in the high quality iris biometric data subpopulation 52-1 may also be included in the high quality face biometric data subpopulation 54-1, which corresponds to subpopulation "A." As a result, it should be understood that enrollees having high quality finger 50-1, iris 52-1, and face 54-1 biometric data are subdivided from the entire population by virtue of being included in the subpopulation "A." It should be understood that enrollees having high quality finger and iris biometric data, but low quality face biometric data, are subdivided from the rest of the population by virtue of being included in subpopulation "B."

As another example, reading diagram 48 from the primary biometric modality column 50 to the subpopulation designation column 56, individuals included in the low quality finger biometric data subpopulation 50-2 may have high quality iris 52-4 biometric data. Thus, these individuals are also included in the high quality iris biometric data subpopulation 52-4. Furthermore, individuals included in the subpopulation 52-4 may have high quality face biometric data. Thus, these individuals are also included in the high quality face biometric data subpopulation 54-7, which corresponds to subpopulation designation "G." As a result, it should be understood that enrollees having low quality finger biometric data 50-2, high quality iris biometric data 52-4, and high quality face biometric data 54-7 are subdivided from the entire population by virtue of being included in the subpopulation "G." It should be understood that individuals having low quality finger biometric data 50-2, high quality iris biometric data 52-4 and low quality face biometric data 54-8 are subdivided from the rest of the population by virtue of being included in subpopulation "H."

As yet another example, reading diagram 48 from the primary biometric modality column 50 to the subpopulation designation column 56, individuals included in the subpopulation 50-3 without finger biometric data may have high quality iris biometric data 52-7. Thus, these individuals are also included in the high quality iris biometric data subpopulation 52-7. Moreover, individuals included in the subpopulation 52-7 may have high quality face biometric data 54-13. Thus, these individuals are also included in the high quality face biometric data subpopulation 54-13, which corresponds to subpopulation designation "M." As a result, it should be understood that individuals without finger biometric data 50-3, but having high quality iris 52-7 and face biometric data 54-13 are subdivided from the entire population by virtue of being included in subpopulation "M." It should be understood that individuals without finger biometric data 50-3, having high quality biometric data 52-7 and low quality face biometric data 54-14 are subdivided from the rest of the population by virtue of being included in subpopulation "N."

It should be understood that in the exemplary embodiment, as part of 1:N identity matching, biometric data of a new enrollee is compared against the gallery. However, it should be appreciated that in other embodiments 1:N identity matching may be conducted with individuals other than new enrollees. The biometric data of an individual that is to be compared against records in the gallery is also known as a probe. Thus, it should be appreciated that biometric characteristics of the probe may be converted into one of the subpopulation designations 56 such that an appropriate matching technique may be determined.

Figure 4:
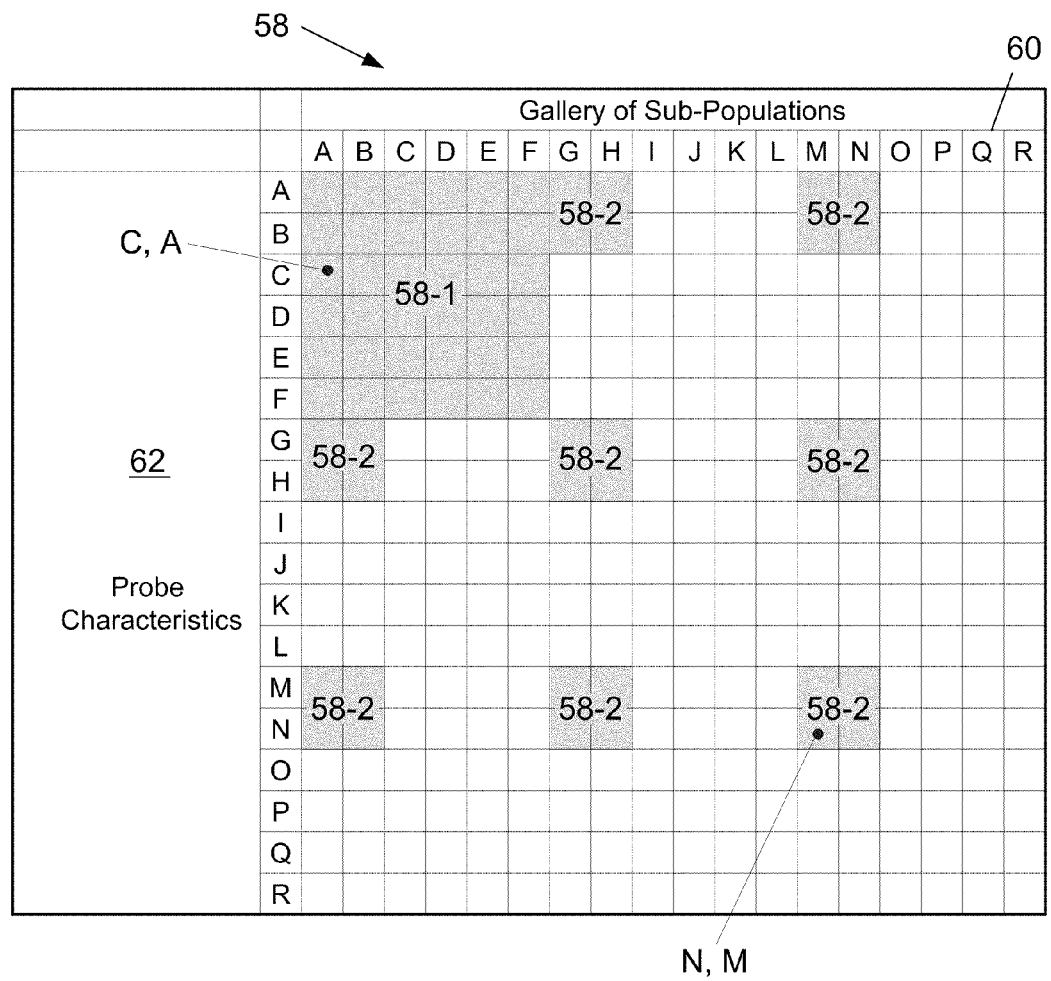
FIG. 4 is a diagram illustrating an exemplary matrix of gallery subpopulations plotted against probe characteristics.

FIG. 4 is a diagram illustrating an exemplary matching matrix 58 of a gallery of subpopulation designations 60 plotted against probe characteristics 62. The matrix 58 is for coordinating combinations of subpopulations and probe characteristics with the matching systems such that each subpopulation-probe characteristic combination corresponds to at least one of the matching systems. Specifically, gallery subpopulation designations 60, corresponding to the subpopulation designations 56, are sequentially positioned along a first side of the matching matrix 58 such that the subpopulation designations 56 are listed as A-R along the first side. The subpopulation designations 56 are also sequentially positioned along a second side of the matching matrix 58 such that the subpopulation biometric characteristics of a probe are listed as A-R sequentially along the second side. It should be appreciated that the second side of the matching matrix 58 is substantially orthogonal to the first side.

It should be understood that the subpopulation designations A-R listed sequentially along the first side of the matching matrix 58 together represent the entire population. Thus, the subpopulation descriptions A-R listed along the first side constitute the gallery of the subpopulations 60. Furthermore, it should be understood the subpopulation designations A-R listed sequentially along the second side of the matching matrix 58 together represent all of the possible combinations of biometric characteristics for the data record of an individual new enrollee that may be included in a probe. Consequently, each column in the matrix 58 corresponds to a different one of the subpopulations designated by A-R and each row in the matrix 58 corresponds to a possible combination of biometric characteristics for the probe. These possible combinations are also known as probe categories. Each probe category corresponds to pattern characteristics of one of the subpopulations. While the probe categories for the exemplary embodiment are the same as the subpopulations defined for the gallery, in other embodiments the probe categories may be different than the subpopulations.

It should be appreciated that matching matrix 58 includes a plurality of cells, or matrix entries, defined by row and column designations. A probe having the biometric characteristics of the subpopulation C may be compared against the subpopulation A. Plotting the row of matrix 58 corresponding to a probe having biometric characteristics of the subpopulation C, against the column of matrix 58 corresponding to subpopulation A yields an intersecting cell, or matrix entry, having an address of C, A. The matrix entry having the address C, A is thus associated with a probe having the biometric characteristics of subpopulation C, that is to be matched against subpopulation A. It should be appreciated that in the exemplary embodiment each matrix entry compatible with the primary biometric modality is assigned to the primary biometric modality and is associated with a corresponding matching system MSn that includes an algorithm for conducting 1:N identity matching based on the primary biometric modality. Each matrix entry that is compatible with the secondary biometric modality, and that is not already assigned to the primary biometric modality, is assigned to the secondary biometric modality and is associated with a corresponding matching system MSn that includes an algorithm for conducting 1:N identity matching based on the secondary biometric modality.

It should be understood that in the exemplary embodiment only matrix entries compatible with high quality finger biometric data or high quality iris biometric data are associated with matching systems MSn that are configured to conduct 1:N identity matching based on the corresponding biometric modality. Such matrix entries are indicated in the shaded regions 58-1 and 58-2 of the matrix 58. Specifically, region 58-1 assigns 1:N fingerprint matching for the matrix entries included therein, while the regions 58-2 assign 1:N iris matching for the matrix entries included therein. A matrix entry is compatible with high quality biometric modality data when the matrix entry is associated with both a probe having high quality biometric modality characteristics and a subpopulation having the same high quality biometric modality characteristic. Moreover, it should be appreciated that matrix entries compatible with either the primary or secondary biometric modality may also be assigned to at least one additional biometric modality and associated with at least one additional matching system MSn that includes an algorithm, corresponding to the at least one additional biometric modality, for conducting a 1:1 verification. The primary and secondary biometric modalities are reliable biometric modalities in the exemplary embodiment.

Matrix entries not compatible with either the reliable primary or secondary biometric modalities are assigned to any biometric modality for which biometric data is available and are associated with at least one of the matching systems MSn that includes an algorithm, corresponding to the available biometric modality data, for conducting unimodal or multimodal matching. For such matrix entries, conducting unimodal or multimodal matching may include conducting parallel fusion of matching results generated by a plurality of different matching systems.

By virtue of plotting an appropriate probe characteristic against each subpopulation included in the gallery of subpopulation designations 60, an appropriate combination of biometric modalities for conducting identity matching for each subpopulation may be determined, as well as the respective matching system or systems MSn for conducting the identity matching. For example, plotting a probe with the characteristics of subpopulation "B" against gallery subpopulation "N" yields a matrix entry address of B, N. Matrix entry B, N indicates that iris biometric data is to be used for conducting the 1:N identity match and that an appropriate respective matching system MSn is to be used for conducting the 1:N identity match. Iris matching is associated with the matrix entry B, N because subpopulation N and the biometric characteristics of the probe, which correspond to the biometric characteristics of subpopulation B, include high quality iris biometric data while subpopulation B does not include high quality finger biometric data. That is, both the probe having the biometric characteristics of subpopulation "B" and subpopulation "N" include high quality data for the secondary biometric modality. Thus, it should be understood that 1:N identity matching is conducted with the biometric modality data common to both the probe characteristic and the subpopulation 60.

When 1:N identity matching is conducted using the primary or secondary biometric modalities, the 1:N identity matching may identify one or more candidate matches. Candidate matches are potential matches. As such, candidate matches are not necessarily true matches. In the exemplary embodiment, the candidate matches are further refined by applying the at least one additional biometric modality and conducting a 1:1 verification of the candidate matches with the at least one additional matching system MSn. Because the number of candidate matches generated as the result of the 1:N identity matching is very small compared to the size of the sub-population, one or more additional biometric modalities may be matched at very low cost using 1:1 or 1:few matching and fused with the 1:N result to remove false matches. Very small is typically less than 10-100 candidates, but in some unusual cases could be over 1,000. It should be understood that the number of candidates is a function of several parameters such as, but not limited to, population size. Consequently, it should be understood that the very small number of candidate matches may vary. By lowering a setting of the 1:N identity matching biometric matching threshold, it is possible to increase the accuracy of the biometric modality used to conduct the 1:N identity match, while accepting the generation of additional candidate matches. By lowering the setting of the 1:N identity matching biometric matching threshold to increase accuracy, then sequentially applying the at least one additional biometric to eliminate candidate matches that are not true matches, the benefits of parallel fusion are realized, but at far lower costs in terms of algorithm and hardware costs.

It should be appreciated that the shaded area 58-1 designates an area within the matching matrix 58 including matrix entries that use high quality finger biometric data to conduct 1:N identity matching. The shaded area 58-1 extends from sub-population A to sub-population F and from probe characteristic A to probe characteristic F. Shaded areas 58-2 designate areas where high quality iris biometric data are used to conduct 1:N identity matching. All other areas, or matrix entries, within the matching matrix 58 represent residual subpopulations for which high quality data does not exist to support the use of a reliable biometric modality to execute 1:N identity matching. When high quality data to support a reliable biometric modality does not exist parallel fusion of available data is used to achieve the best possible matching accuracy. Because the residual subpopulations are small compared to the subpopulations represented by the shaded areas 58-1 and 58-2 in the matrix, parallel fusion matching techniques provide reliable and accurate identity matching results at a low cost. Such small residual subpopulations are generally less than 10% of the entire population. Thus, it should be understood that each row in the matching matrix 58, corresponding to a probe characteristic 62, describes how a given probe can best be matched against all the subpopulations A-R to yield a highest quality 1:N identity matching result with the lowest resource consumption.

It should be understood that the small residual subpopulations may decrease as a percentage of the entire population as higher quality data is obtained from members of the small residual subpopulations. Consequently, authentication systems using the matching matrix 54 automatically become more efficient as data quality improves. By virtue of automatically becoming more efficient, authentication systems automatically adapt to take advantage of higher quality data, should higher quality data become available. Thus, regardless of an initial size of the small residual subpopulations, authentication systems using the matching matrix 58 may offer significant value.

It should be understood that parallel fusion is conducted when a residual subpopulation matrix entry is not associated with high quality data from either of the primary or secondary biometric modalities, but is associated with low quality biometric data or biometric data of a plurality of other biometric modalities. When a residual subpopulation matrix entry is not associated with biometric data of a plurality of biometric modalities, multi-modal parallel fusion cannot be conducted. Instead, the biometric data associated with the residual subpopulation matrix entry may be used to conduct any other type of matching transaction. For example, when the residual subpopulation matrix entry is associated with a single biometric modality, the biometric data of the single biometric modality may be used to conduct matching transactions in two different matching systems, and the results fused. Such fusing of results from two different matching systems of the same biometric modality is known as parallel uni-modal fusion.

Figure 5:
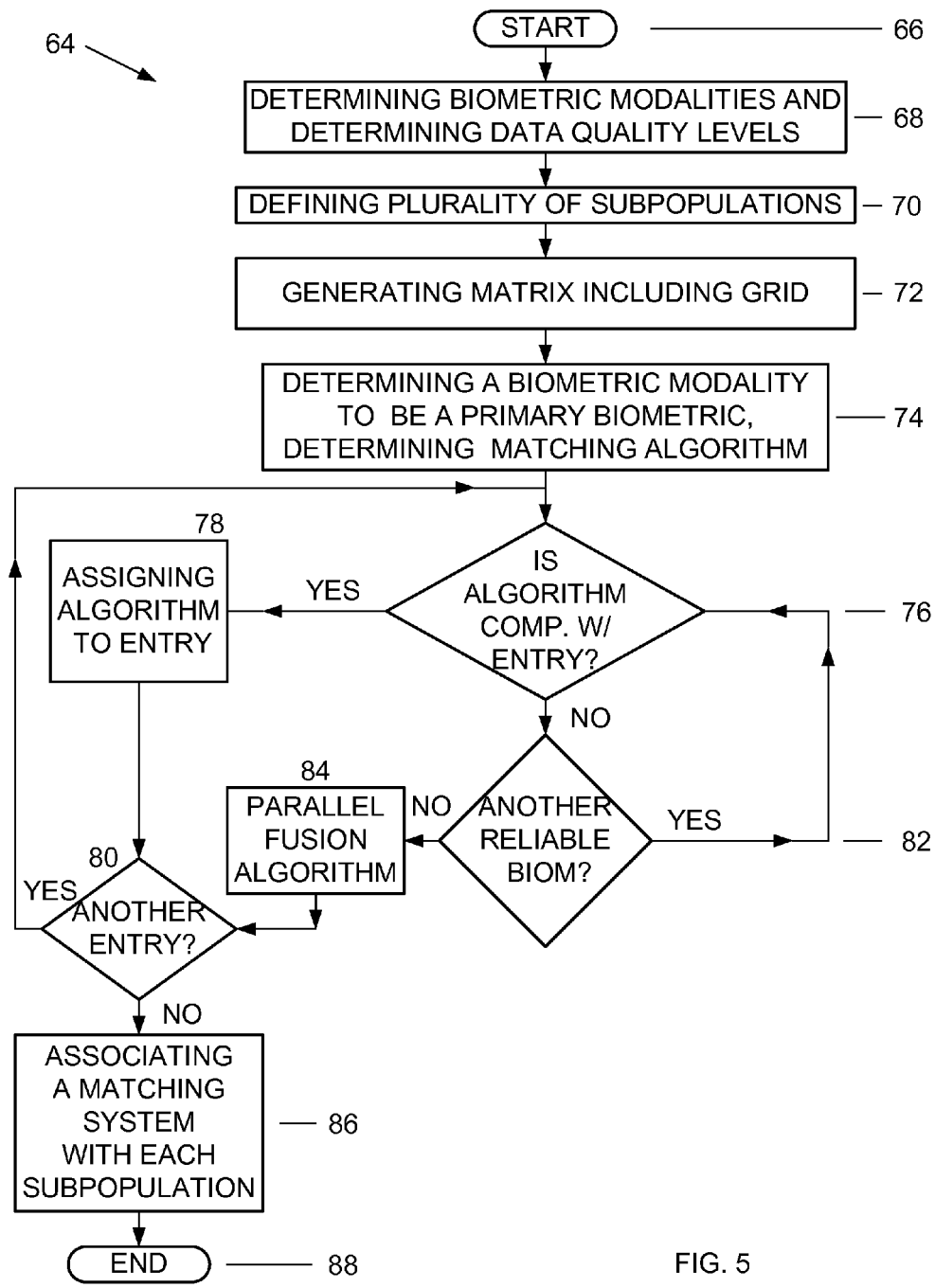
FIG. 5 is a flowchart illustrating an exemplary process for generating the exemplary matrix illustrated in FIG. 4.

FIG. 5 is a flowchart 64 illustrating an exemplary process for generating the exemplary matrix 58 illustrated in FIG. 4. The process starts 66 by determining a plurality of biometric modalities 68 to be used in conducting the 1:N identity matches and determining 68 data quality categories in accordance with the flowchart 30 as described herein and as illustrated in FIG. 2. In the exemplary embodiment, the biometric modalities used for conducting the identity matches are finger and iris. It should be appreciated that for some biometric modalities, such as face, an "unavailable data" quality category may not be included.

Processing continues by defining 70 a plurality of subpopulations A-R in accordance with the flowchart 30 described herein and as illustrated in FIG. 2. After defining 70 the plurality of subpopulations A-R, the process continues by generating 72 a matrix including a grid that defines a plurality of matrix entries, positioning 72 the subpopulation designations A-R along a first side of the grid, and positioning 72 the subpopulation designations A-R along a second side of the grid. It should be understood that each subpopulation designation A-R positioned along the first side labels a column of the matching matrix 58 and that each subpopulation designation positioned along the second side labels a row of the matching matrix 58.

The process continues by determining 74, in accordance with the flowchart 30 as described herein and as illustrated in FIG. 2, one of the plurality of biometric modalities that is to be the primary biometric modality used for conducting the 1:N identity matching, and determining 74 a primary biometric matching algorithm, based on the primary biometric modality, for conducting identity matching. Moreover, a secondary matching algorithm is determined that corresponds to the secondary biometric modality. It should be understood that in the exemplary embodiment the primary and secondary biometric modalities provide reliable 1:N identity matching results, at low cost and are associated with few false candidate identity matching results. These reliable biometrics cover the vast majority of the entire population because an extremely high percentage of the overall population generally has high quality data for finger, or iris, or both. For these individuals, sequential fusion as described herein works very efficiently, and only a small percentage of persons without high quality finger data and without high quality iris data require the use of parallel fusion techniques to maintain high accuracy. A small percentage of persons is less than 10% of the population, and will frequently be as small as 1% of the population.

Next, the process continues by determining 76 whether one of a plurality of biometric modality matching algorithms is compatible with each matrix entry. A matching algorithm is compatible with a matrix entry when the biometric modality and biometric data quality required by the matching algorithm agree with the biometric modality and biometric data quality of both the probe and the subpopulation corresponding to the matrix entry. Thus, the primary biometric matching algorithm is compatible with a matrix entry when the probe and subpopulation corresponding to the matrix entry each include the biometric data of the primary modality and at the quality required by the primary biometric matching algorithm. After determining that the primary biometric matching algorithm is compatible with the matrix entry, processing continues by assigning the primary biometric modality to the matrix entry, assigning 78 the matching algorithm to the matrix entry, and, assigning another algorithm to the matrix entry corresponding to the at least one additional biometric modality for conducting a 1:1 verification. Next, processing continues by determining 80 whether there is another matrix entry that has not been evaluated for compatibility. When another matrix entry is available for evaluation of compatibility processing continues by determining 76 whether the primary biometric matching algorithm is compatible with the other matrix entry.

When the primary biometric matching algorithm is incompatible with the other matrix entry, processing continues by determining 82 whether the secondary biometric matching algorithm is compatible with the other matrix entry. Specifically, processing continues by determining whether the probe and subpopulation corresponding to the other matrix entry each include the biometric data of the secondary modality and at the quality required by the secondary biometric algorithm. When the secondary biometric matching algorithm is compatible with the biometric characteristics of the other matrix entry, the secondary biometric modality is assigned to the other matrix entry, a corresponding secondary biometric matching algorithm is assigned to the other matrix entry, and another algorithm is assigned to the other matrix entry that corresponds to the at least one additional biometric modality for conducting a 1:1 verification. Otherwise, processing continues by assigning 84 a parallel fusion algorithm to the other matrix entry. It should be appreciated that parallel fusion economically compensates for the lack of high quality data because it is applied to only subsets of the entire population. Each subset corresponds to less than 10% of the entire population, and typically less than 1%. When a matrix entry is not associated with biometric data of a plurality of biometric modalities for which biometric data is available, a multi-modal parallel fusion algorithm cannot be assigned to the matrix entry. Instead, any type of matching algorithm corresponding to the available biometric data, judged to be the best algorithm for processing the available biometric data, may be assigned to the matrix entry. For instance, matrix entry R-R corresponds to a situation where only low quality facial data is available for both the probe and the subpopulation to be matched, so in this situation one or more facial matching algorithms would be assigned to matrix entry R-R.

Next, the method continues by determining 80 whether another matrix entry is available that has not been evaluated for compatibility. When another matrix entry is not available the method continues by associating 86 matching systems MSn to each matrix entry that execute the algorithms assigned to each matrix entry. By virtue of assigning matching systems to each matrix entry, each of the matching systems is also associated with a subpopulation. It should be understood that each matrix entry is associated with at least one of the matching systems MSn that is configured to execute the matching algorithm, or algorithms, assigned to the matrix entry. Next, processing ends 88.

Figure 6:
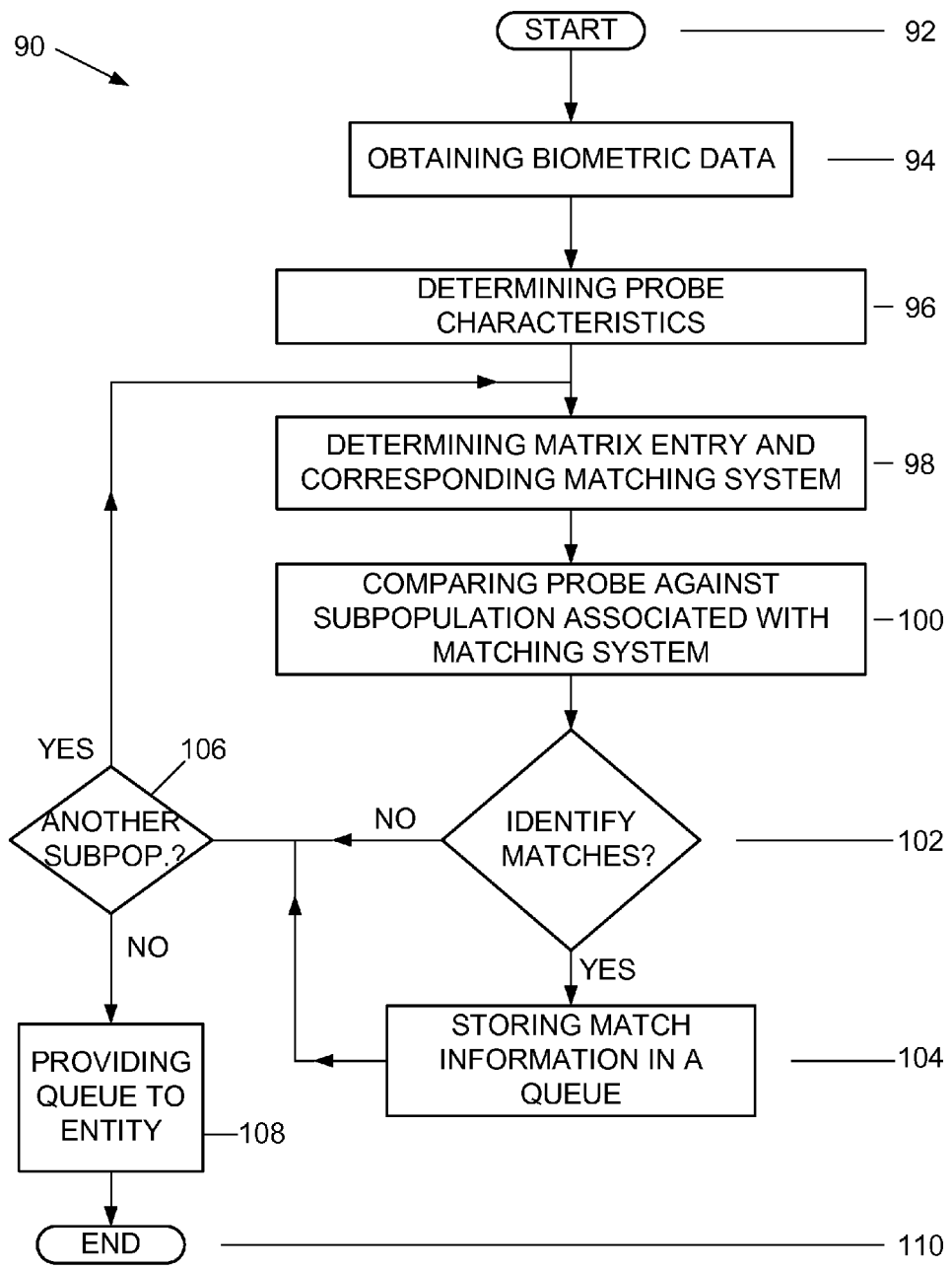
FIG. 6 is a flowchart illustrating an exemplary process for conducting efficient 1:N identity matching of individuals.

FIG. 6 is a flowchart 90 illustrating an exemplary process for conducting efficient 1:N identity matching of individuals, included in a gallery composed of biometric data subpopulations, to account for enrollees that are unable to provide desired high quality biometric data samples. The process starts 92 by obtaining 94 the primary, secondary and tertiary biometric modality data from an enrollee and including the obtained biometric modality data in a probe. Processing continues by determining the biometric characteristics of the probe 96 by evaluating the quality of the obtained primary, secondary and tertiary biometric modality data, and determining the category of the probe. Next, a row designated by the one subpopulation A-R that has the same characteristics as the probe is determined. The determined row also corresponds to the determined probe category. Each row in the matrix includes a plurality of matrix entries, and each of the matrix entries corresponds to a different subpopulation of the gallery.

Next, processing continues by determining each of the matrix entries in the row and the matching systems associated with each of the matrix entries in the row. Specifically, the process continues by determining 98 one of the plurality of matrix entries included in the row that corresponds to subpopulation A, and determining 98 the at least one matching system MSn associated with the one matrix entry. Processing continues by conducting a 1:N identity matching transaction with the at least one matching system by comparing 100 the probe against the matching system enrollment data records of the subpopulation stored therein, and determining 102 whether any of the matching system enrollment data records stored therein are identified as matching the probe. When the probe matches 102 at least one matching system enrollment data record stored in the at least one matching system during a 1:N identity matching transaction based on a reliable biometric modality, the at least one matching system enrollment data record is determined to be a candidate match. When the one matrix entry is also associated with at least one additional biometric modality, processing continues by conducting a 1:1 verification. Specifically, the 1:1 verification is conducted by evaluating the at least one matching system enrollment data record using the at least one additional biometric modality assigned to the one matrix entry. The at least one additional biometric modality is typically different than the biometric modality used to conduct the 1:N matching transaction. Any matching system enrollment data record determined to be a final match as a result of the 1:1 verification is stored in a queue 104 in the GPMMC system 12. Such matching system enrollment data records stored in the queue 104 are final candidate matches.

When the probe matches 102 a matching system enrollment data record stored in the determined matching system during a 1:N identity match based on a parallel fusion algorithm, the candidate match is also stored as a final candidate match in the queue 104. Processing continues by determining 106 whether the probe has been compared against all of the subpopulations A-R.

Otherwise, when the probe does not match 102 a matching system enrollment data record in the determined matching system 102, processing continues by determining 106 whether the probe has been compared against all of the subpopulations A-R. By virtue of comparing the probe against each of the subpopulations A-R, the probe is compared against the entire population. When the probe has not been compared 106 against all of the subpopulations A-R, processing continues by determining a next matrix entry 98 included in the row that corresponds to a subpopulation A-R that has not been matched in a 1:N matching transaction against the probe. Otherwise, when the probe has been compared 106 against all of the subpopulations A-R, processing continues by providing 108 the queue to the entity requiring the 1:N identity matching transaction. For example, the queue may be communicated to a motor vehicle administration, a financial institution, a health care provider, the Internal Revenue Service, or the social security administration. It should be understood that by virtue of storing the final candidate matches in the queue that the candidate matches from all of the subpopulations are consolidated into a single response. Next, processing ends 110.

In other embodiments, prior to providing 108 the queue to the entity, each final candidate match included in the queue may be processed such that final candidate matches generated by different matching systems MSn are normalized to ensure they represent similar probabilities of matching. Such normalization processing may result in some final candidate matches being discarded.

Although a subsequent 1:1 verification matching transaction process occurs in the exemplary process after conducting a 1:N identity matching transaction using a reliable 1:N biometric modality, it should be appreciated that in other embodiments a subsequent 1:1 verification process need not be conducted when using reliable biometric modalities. In such other embodiments the matching system enrollment data records determined as a result of the 1:N matching transaction are stored in the queue 104 as final matches. The exemplary process sequentially conducts 1:N identity matching using a highly reliable biometric and 1:1 verification to determine final candidate matches. Moreover, a substantial majority of matching computations are anticipated to be conducted in accordance with the exemplary process. Consequently, the entire exemplary process as described herein may be referred to colloquially as sequential fusion.

As described herein, sequential fusion is able to provide at least the same efficiency as parallel fusion, with virtually all of the same benefits, even when biometric data of the desired modality and quality is not available from all members of an entire population. Such benefits include reducing failure to enroll rates, increasing accuracy, and decreasing false acceptance rates. Sequential fusion is also a self adapting process in that it performs no worse than parallel fusion, even when an authentication system has only low quality data, and will automatically deliver greater efficiency as higher quality data is enrolled into the authentication system. Thus, it should be appreciated that sequential fusion provides efficient fusion of multiple matching algorithms.

Although the exemplary process divides a population into subpopulations based on the quality of biometric data and uses the subpopulation data to conduct sequential fusion, or to conduct 1:N parallel fusion, it should be appreciated that in other embodiments other bases for characterizing subpopulations and probe characteristics may be used. For instance, the presence or absence of a biometric modality, rather than the quality level of the data, could be used to define subpopulations and probe characteristics.

Furthermore, the processes described herein are applicable to pattern matching systems not involving biometrics. For example, other types of pattern matching systems for which these processes would apply include the matching of biographic data or object data. Such biographic data includes, but is not limited to, an individual's name, age, date of birth, address, citizenship and marital status. As an example of object data, if a database of ships includes electronic characteristics of radio transmitters for each ship and sonar characteristics of the engines and hull of each ship, the database of ships may be used to compare recently obtained radio and sonar data to identify a ship. In such other types of pattern matching systems, the same challenges arise as to how to most efficiently combine the results of multiple matching algorithms when making these comparisons. Thus, it should be appreciated that although the exemplary process describes biometrically matching people, in other embodiments non-biometric pattern matching may be used for matching any type of objects.

Although the exemplary embodiment assigns biometric modalities and corresponding matching systems for subpopulations to matrix entries as a method of coordinating the subpopulations with the matching systems such that each subpopulation corresponds to at least one of the matching systems, it should be appreciated that any method of coordinating the subpopulation with the matching systems such that each subpopulation corresponds to at least one of the matching systems may be used that facilitates conducting the efficient fusion of multiple matching algorithms as described herein.

In the exemplary embodiments, the above described processes of determining subpopulations of biometric data, facilitate quickly, accurately, and economically conducting 1:N identity matching using reliable 1:N biometric modalities followed by 1:1 verification for short lists of candidate matches for the bulk of an overall population. Thus, sequential fusion may be used to efficiently conduct matching for the bulk of an overall population. The remaining residual subpopulations which cannot support a reliable 1:N biometric modality are processed using 1:N parallel fusion or other techniques. It should be appreciated that different subsets of the population have different combinations of biometric modality data, so 1:N identity matching techniques may vary by sub-population. More specifically, a subpopulation matrix is generated and is used to facilitate associating a plurality of different matching systems with corresponding segments, or subpopulations, within an entire population. Each matching system includes a different matching algorithm that may be configured to conduct at least one of 1:N identity matching, 1:1 verification, and 1:N parallel fusion on the corresponding subpopulation, and the results from each 1:N identity match and 1:1 verification, or of the 1:N parallel fusion matching, generated by the different matching systems are aggregated into a single consolidated response.

Consequently, results from 1:N identity matching conducted for an entire population where different subsets of the population have different sets of biometric modality data are facilitated to be accurate, and the time and costs associated with such 1:N identity matching is facilitated to be reduced. Accordingly, economic and efficient management of data is facilitated to be enhanced in a cost effective and reliable manner.

While the invention has been described in terms of various specific embodiments, those skilled in the art will recognize that the invention can be practiced with modification within the spirit and scope of the claims.

What is claimed is:

1. A method of conducting matching comprising:
   establishing categories for probes to be used during matching transactions, each probe category corresponding to characteristics common to objects of a subpopulation, the subpopulation being included in a plurality of different subpopulations, wherein each subpopulation has different characteristics;
   generating subpopulation and probe category combinations by associating each probe category with each subpopulation;
   matching each combination with a matching computer hardware system that executes an algorithm based on characteristics of the combination subpopulation, the matching computer hardware system being included in a plurality of matching computer hardware systems and being configured to execute an algorithm based on characteristics of the associated subpopulation, wherein each matching computer hardware system is associated with a different subpopulation;
   obtaining data for an object, configuring the obtained object data as a probe, and determining the probe category for the probe; and
   conducting a matching transaction between the probe and each subpopulation using the matching computer hardware system associated with each combination of subpopulation and the determined probe category.

2. A method in accordance with claim 1 further comprising:
   determining at least one candidate match when the probe matches at least one enrollment data record in the matching computer hardware system for a subpopulation; and
   conducting a subsequent matching transaction when a subpopulation is a non-residual subpopulation to determine final candidate matches.

3. A method in accordance with claim 2 further comprising consolidating the at least one final candidate match into a single response by storing the at least one final candidate match in a queue.

4. A method in accordance with claim 2, wherein:
   said conducting step comprises conducting a 1:N identity matching transaction; and
   said conducting a subsequent matching transaction step comprises conducting a 1:1 verification matching transaction.

5. A method in accordance with claim 1 further comprising dividing an entire population into the subpopulations.

6. A method in accordance with claim 1, said conducting step comprising comparing the probe against the enrollment data records for each subpopulation in a 1:N identity matching transaction based on reliable object data.

7. A method in accordance with claim 1, said conducting step comprising conducting a parallel fusion matching transaction with best available object data.

8. A method in accordance with claim 1 further comprising determining at least one candidate match when the probe matches at least one enrollment data record in the matching computer hardware system for a subpopulation.

9. A system for conducting matching comprising:
   matching computer hardware systems, each matching computer hardware system being configured to store enrollment data records of a subpopulation assigned thereto, being associated with a different subpopulation and being configured to execute an algorithm based on characteristics of the associated subpopulation, each subpopulation having different characteristics;
   at least one client system configured to obtain object data; and
   a computer configured as a server, said server, said matching computer hardware systems, and said at least one client system being configured to communicate over a network, said server including at least a database and being configured to
      store within said database at least enrollment data records for subpopulations,
      establish categories for probes used during matching transactions, each probe category corresponds to characteristics common to objects of a subpopulation included in the subpopulations, and
      convert obtained object data into a probe and determine the probe category of the probe,
   said matching computer hardware system being further configured to conduct a matching transaction between the probe and each subpopulation, and determine a candidate match when the probe matches an enrollment data record from a subpopulation.

10. A system in accordance with claim 9, said server being further configured to coordinate subpopulation and probe category combinations with said matching computer hardware systems such that each combination corresponds to a matching computer hardware system.

11. A system in accordance with claim 9, said matching computer hardware system being further operable to conduct a subsequent 1:1 matching transaction when a corresponding matching computer hardware system is associated with a reliable biometric modality.

12. A system in accordance with claim 9, said matching computer hardware system being further configured to conduct the matching transaction as a 1:N identity matching transaction based on reliable object data, and to conduct the matching transaction as a parallel fusion matching transaction with best available object data.

13. A system in accordance with claim 9 said server being further configured to divide an entire population into subpopulations, wherein the object data comprises one of biometric data and ship data.

14. A system in accordance with claim 11 said matching computer hardware system being further configured to conduct the subsequent 1:1 verification transaction by evaluating the at least one candidate match when said matching computer hardware system is associated with additional object data.

15. A method of conducting object matching comprising:
   matching subpopulations with matching computer hardware systems, each subpopulation has different characteristics and is assigned to a matching computer hardware system that executes an algorithm based on characteristics common to objects comprising the subpopulation;

obtaining object data and configuring the obtained object data as a probe; and conducting a matching transaction between the probe and each subpopulation using the matching computer hardware system associated with each subpopulation.

16. A method in accordance with claim 15 further comprising conducting a subsequent matching transaction when the matching computer hardware system including the matching enrollment data record is associated with reliable object data.

17. A method in accordance with claim 15 further comprising:

determining a candidate match when the probe matches at least one enrollment data record in a matching computer hardware system;

normalizing the candidate match; and consolidating the candidate match into a single response by storing the candidate match in a queue.

18. A method in accordance with claim 16, wherein:

said conducting step comprises conducting a 1:N identity matching transaction; and said conducting a subsequent matching transaction step comprises conducting a 1:1 verification matching transaction.

19. A method in accordance with claim 15, said conducting step comprising conducting a parallel fusion matching transaction with best available object data.

20. A method of managing large scale biometric data identity matching when subsets of an overall population have different combinations of biometric data, said method comprising:

identifying a plurality of biometric modalities to be used in conducting identity matches;

determining data quality levels for each of the biometric modalities;

defining a plurality of subpopulations;

generating a matrix including a grid, defining a plurality of matrix entries with the grid, positioning designations for each of the subpopulations along a first side of the matrix and along a second side of the matrix;

determining one of the plurality of biometric modalities to be a primary biometric modality and determining at least one matching algorithm;

determining whether the at least one matching algorithm is compatible with each matrix entry, and when the at least one matching algorithm is compatible with the matrix entry assigning a corresponding one of a plurality of matching systems configured to execute the at least one matching algorithm to the matrix entry;

assigning additional ones of the plurality of matching systems to the matrix entry, wherein the additional matching systems are configured to conduct 1:1 or 1:few matching after the corresponding one of the matching systems conducts a 1:N identity matching;

obtaining biometric data, configuring the obtained biometric data as a probe, and determining characteristics of the probe such that a row in the matrix, to be used to define matching for an entire population, is determined;

determining a first matrix entry corresponding to the characteristics of the probe and to a first one of the subpopulations, and determining at least one matching system corresponding to the first subpopulation;

comparing the probe against enrollment data records stored in the corresponding at least one matching system to conduct the identity match;

storing information regarding a matching enrollment data record in a queue when the probe matches an enrollment data record; and communicating the queue to an entity performing the identity match.

21. A system for managing large scale biometric identity matching when subsets of a population have different combinations of biometric data, said system comprising:

a computer configured as a server, said server including at least a database, said server being configured to store within said database at least enrollment data records of a population, to determine a plurality of biometric modalities, to determine quality levels of the biometric modalities, to define a plurality of subpopulations, to determine a primary biometric modality and to generate a matrix;

at least one client system configured to communicate with said server;

a plurality of matching systems configured to communicate with said server, to conduct 1:1 or 1:few matching after conducting 1:N identity matching, and to compare a probe against matching system enrollment data records stored therein, wherein said server is further configured to communicate with said at least one client system and said matching systems, determine a first matrix entry included in the matrix corresponding to the characteristics of the probe and to a subpopulation, and to determine at least one of said matching systems corresponding to the subpopulation, and store information regarding a matching enrollment data record included in the matching system enrollment data records in a queue when the probe matches a matching system enrollment data record.

* * * * *